May 18, 1943.  F. AMIOT  2,319,285
PILOTING SYSTEM FOR AIRCRAFT
Filed Aug. 5, 1939  3 Sheets-Sheet 3
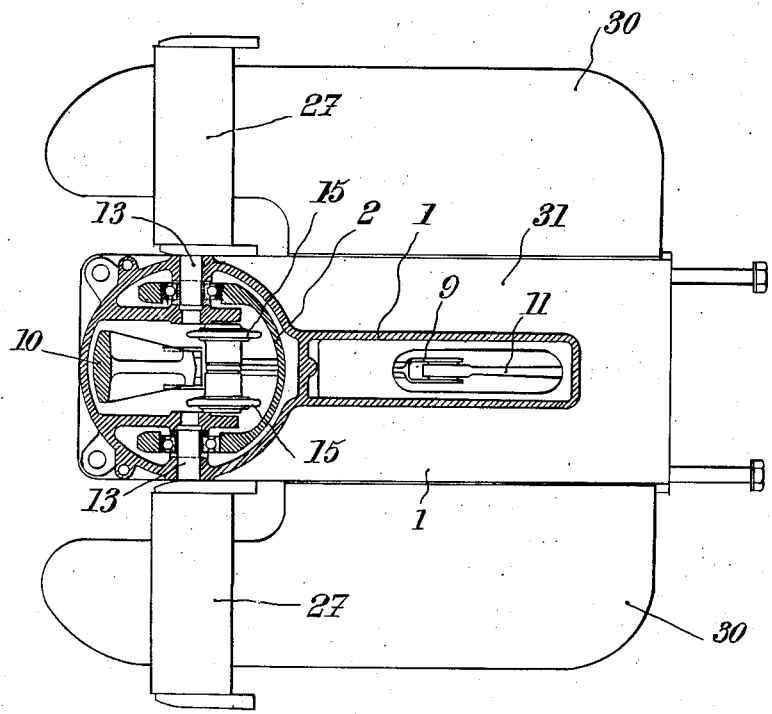
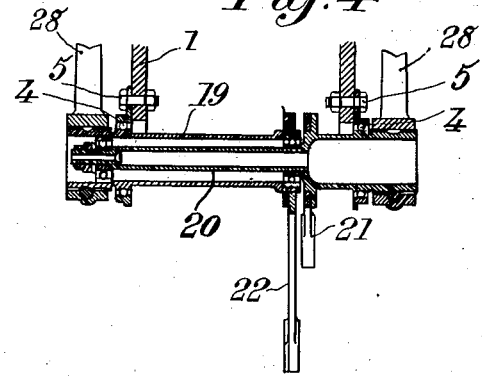
Inventor:
Félix Amiot,
Attorneys Patented May 18, 1943

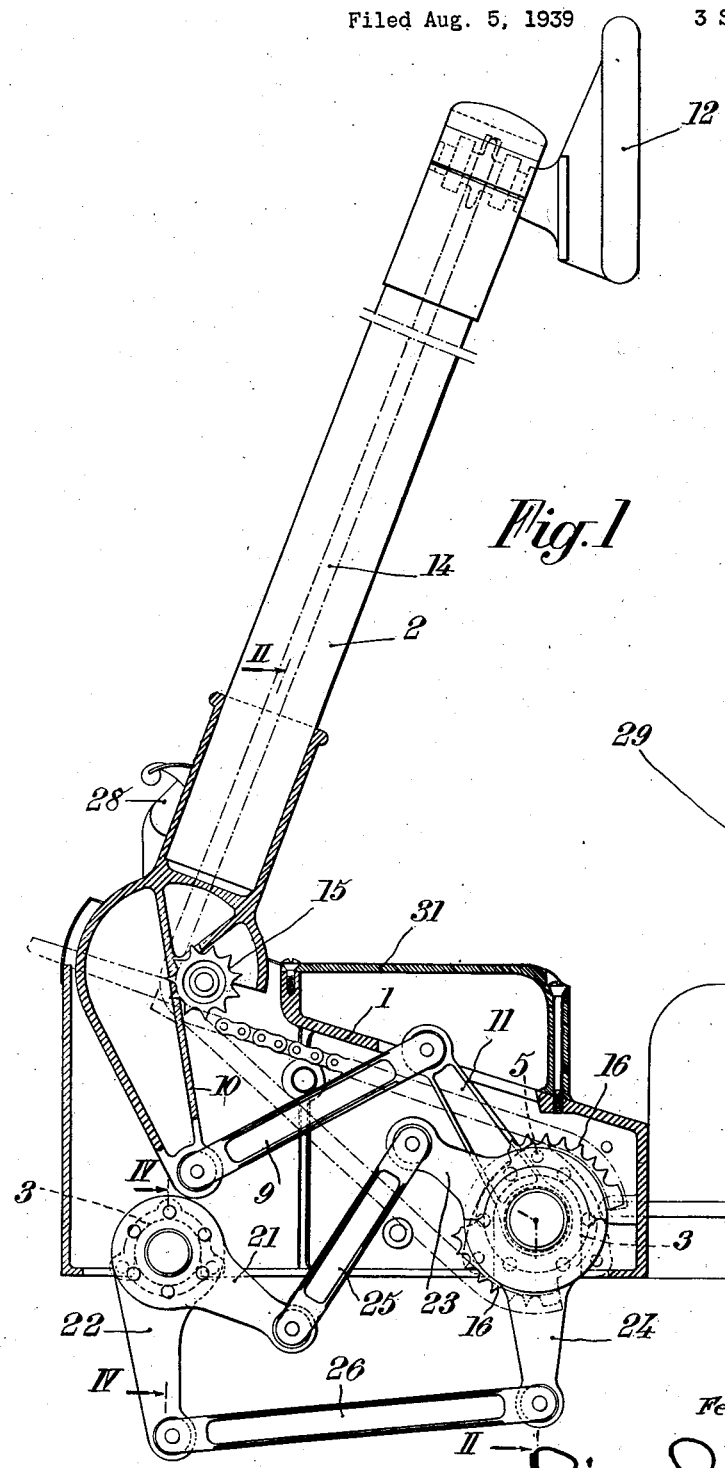

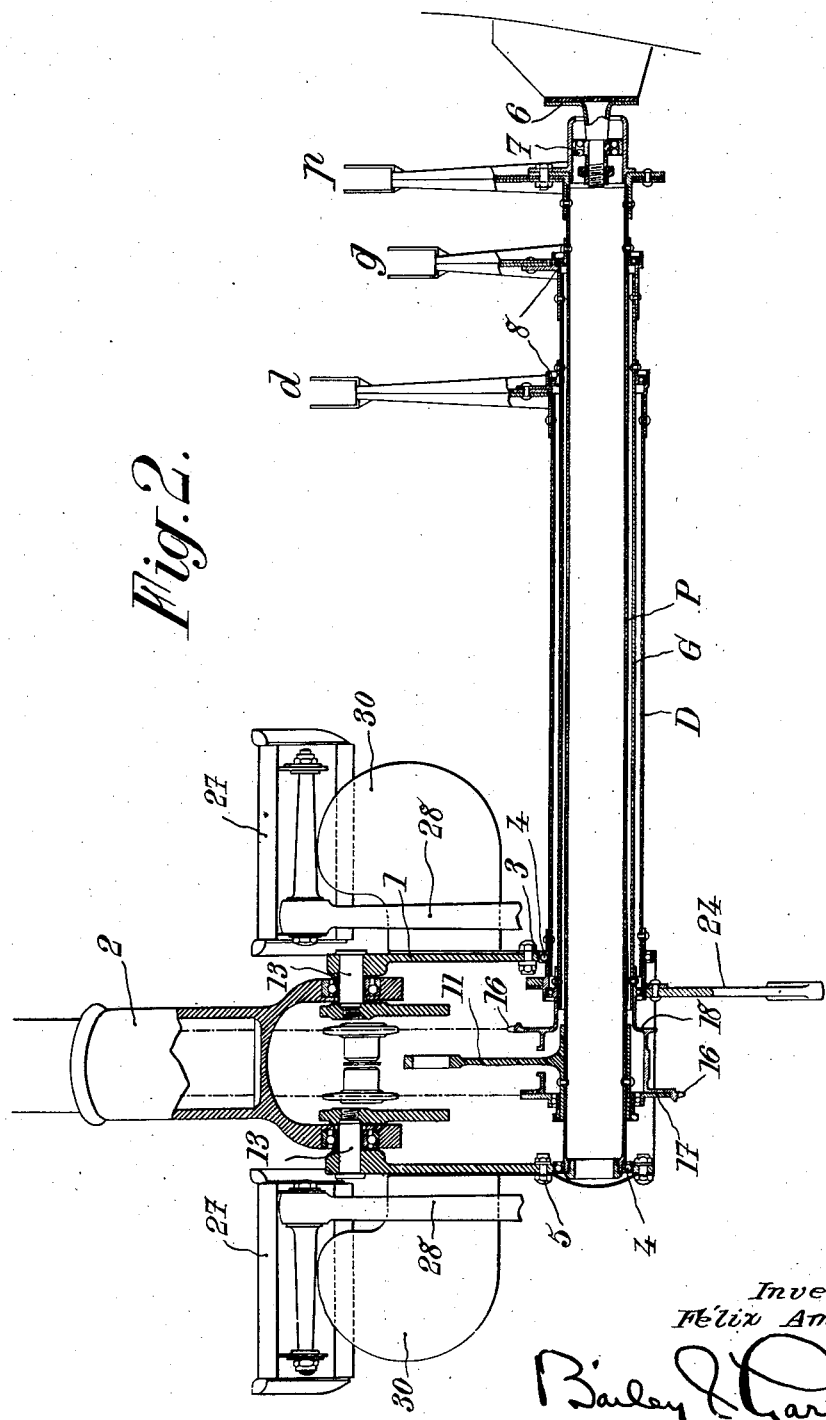

2,319,285

UNITED STATES PATENT OFFICE 2,319,285

PILOTING SYSTEM FOR AIRCRAFT

Félix Amiot, Neuilly-sur-Seine, France; vested in the Alien Property Custodian

Application August 5, 1939, Serial No. 288,679
In France January 9, 1939

2 Claims. (Cl. 244—83)

The present invention relates to piloting systems of the kind used in aircraft, that is to say systems intended to enable the pilot to control pitching, rolling, and yawing.

The chief object of the present invention is to provide a system of this kind which is easier to fit and easier to operate than the systems used for the same purpose up to this time.

According to an essential feature of the present invention, the controls, and especially the controls leading to the operating links, are grouped to a common block, combined with the supporting frame of the system in such manner that it can be mounted in a removable manner thereon, said supporting frame being, for instance, provided for this purpose with apertures in which the bearings of said block can be engaged and fitted.

According to another feature of the present invention, in a block of the type above mentioned, the rudder pedals are adapted to act respectively on two concentric shafts.

According to still another feature of the invention, in a system of the type above described, the pivoting spindle or swivel of the control column or stick is arranged in a forward position, for instance substantially over the axis about which the rudder pedals turn.

According to still another feature of the present invention, the system includes, between the supporting frame above mentioned and the body of the airplane, at least one output shaft and this last mentioned shaft is provided at least at one of its ends with a swivel bearing.

Other features of the present invention will result from the following detailed description of some specific embodiments thereof.

Preferred embodiments of the present invention will be hereinafter described, with reference to the accompanying drawings, given merely by way of example, and in which:

Fig. 1 is an elevational view, partly in section, of a control system for an airplane, made according to the invention;

Fig. 2 is a sectional view on the line II—II of Fig. 1;

Fig. 3 is a plan view partly in section corresponding to the preceding figures;

Fig. 4 is a sectional view on the line IV—IV of Fig. 1.

According to the invention, the controls, and especially the controls leading to the links which transmit the piloting displacements to the control surfaces, such as the movable tail elements and the ailerons are grouped into a single block which can be mounted as a whole, in a removable manner, on the supporting frame of said system.

At the present time, the arrangements in use, which are rather complicated, compel the constructor to finish the control system above referred to at the same time as the airplane structure, and therefore before the various accessories which are to be provided inside the cabin or cockpit have themselves been mounted, since the fitting of these accessories takes place at the end of the construction, when the engine has been mounted. It follows that this fitting of the accessories is very difficult because the presence of the piloting system inside the cabin leaves little room for work.

The arrangement according to the invention, as above set forth permits, among other advantages, the mounting of the piloting system substantially at the end of the assembly so that, for the fitting of the accessories in question, the presence of said piloting system does not interfere with the work to be performed.

According to the preferred embodiment illustrated by the drawings, use a group of three concentric shafts P, G, D, corresponding respectively to the control of pitching, rolling and yawing, and at the ends of which are fixed, levers $p$, $g$, $d$ to which can be connected the operating link systems leading to the control surfaces.

Preferably, the apparatus is arranged in such manner that this block of three shafts, with a part of the kinematic connections, can itself be mounted as a removable unit on the frame which supports the control column or stick and the rudder pedals or bar.

For this purpose, for instance, frame 1, on which the control column 2 is pivotally mounted, is opened at the bottom and provided with notches such as indicated by the reference numerals 3 which permit introducing thereinto fixing bearings 4 (Fig. 2), preferably ball bearings, for supporting the shaft or shafts P, G, D.

The bearing 4 located on the left hand side in Fig. 2 supports the end of the inner shaft P, while the bearing 4 on the right hand side supports the outer shaft.

The fixation of the bearings 4 are secured to the frame 1 by means of bolts 5 or any other means.

Another support for the shafts is indicated at 6, on the body of the airplane, cooperating with another bearing 7, preferably made as it will be hereinafter explained.

The three shafts are held in coaxial relation to one another intermediate bearings 8. The elements of the ball cages, and, in a general manner, all other elements coacting with said shafts, can be fixed thereon by means of rivets, as illustrated, by welding, or in any other way.

The kinematic connections for transmitting the movements to shafts P, G, D, are made as follows:

Concerning first the pitching control, I use, for instance, a coupling rod 9, pivoted at one end to an arm 10 rigid with column 2, and at the other end to an arm 11 rigid with the pitching control shaft P. The column 2 is pivotally supported on spindles 13 as shown in Fig. 2.

The rolling control means comprises a wheel 12 mounted on column 2, the connection between wheel 12 and shaft G being effected by chain 14 which is caused to pass around pinions 15. It is preferred that the chain pass through axis of spindle 13. The ends of chain 14 mesh with toothed sectors 16 carried by pieces 17, 18 (Fig. 2), which are rigid with shaft G.

The rudder control, according to the invention, is arranged in such manner that the pedals can control two concentric shafts which form, with respect to frame 1, a removable block.

These two shafts 19, 20 (Fig. 4) are mounted on ball bearings and fitted with arms 21, 22. Connecting rods 25, 26 are interposed between said arms and corresponding arms 23, 24 rigid with shaft D.

Finally, the rudder pedals 27 have their arms 28 removably mounted on the ends of said shafts 19, 20.

While other arrangements may be made, it is preferred that the block P, G, D be arranged so that it extends toward the rear, close to the seat 29 of the pilot, in such manner as to reduce to the minimum the length of the link transmissions leading to arm p, g, d from the control surfaces.

Furthermore, according to another feature of the invention, the axis of articulation of the control column or stick will be located in a relatively forward position, so as to leave clear space for feet and legs of the pilot.

This may involve, for the column or stick, in its normal position, a certain inclination, which is not at all disturbing. Of course, if it were necessary to compensate for the torque, with respect to axis 13, resulting from this inclination, any means might be used for this purpose. As a rule, this compensation will be made in the transmissions between the control column or stick and the control surfaces.

Frame 1 may be completed by foot rests 30, located at the level of a cover 31 which, when unscrewed allows access to the inside of the box.

According to still another feature of the invention, means are provided for compensating, when mounting the parts or even in flight, differences of level between the bearings carried by support 1 and the bearings 7 carried by the airplane body.

For this purpose, these means include a swivelling mounting of one of the ends of block P, G, D. On the drawings (Fig. 2) bearing 7 is swivelled to the airplane body.

In this way, the mounting is made possible in all cases, and, furthermore any abnormal stress on block P, G, D is avoided.

The device according to the invention has, among others, the following advantages:

a. It permits a quick fitting of the piloting system, when the accessories have already been fitted on the inside of the cockpit or cabin.
b. It can easily be taken to pieces.
c. It is well adapted to quantity production.
d. It facilitates piloting.

It is to be understood that the term "manually operable means" includes foot operated elements.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. In an aircraft having a fuselage, three separately movable control surfaces mounted thereon, a support member, means mounting said support member in said fuselage and a plurality of manual control means corresponding, respectively, with said control surfaces movably mounted on said support member, unitary transmission means including three separately movable, coaxial shafts journalled in one another, means mounting said unitary transmission means on said support member, means operably connecting each of said shafts with one of said control surface means and the corresponding manual control means, two of said manual control means comprising pedals, the means connecting the last named means with one of said shafts comprising a pair of coaxial, separately movable shafts, means rotatably mounting said shafts on said support member, and link and lever means connecting the members of said pair of coaxial shafts with one of the three coaxial shafts, and means connecting each of said two coaxial shafts, respectively, with said pedals, the arrangement being such that when one of said pedals is moved in one direction, said one coaxial shaft is rotated clockwise and when the other of said pedals is pushed in said one direction, the last-mentioned coaxial shaft is rotated counterclockwise.

2. In an aircraft having a fuselage, three separately movable control surfaces mounted thereon, a support member, means mounting said support member in said fuselage and a plurality of manual control means corresponding, respectively, with said control surfaces movably mounted on said support member, unitary transmission means including three separately movable, coaxial shafts journalled in one another, means mounting said unitary transmission means on said support member, means operably connecting each of said shafts with one of said control surface means and the corresponding manual control means, and swivel means mounting one end of said transmission means on said fuselage.

FÉLIX AMIOT.